US005353535A

United States Patent [19]

Plumly

[11] Patent Number: 5,353,535

[45] **Date of Patent: * Oct. 11, 1994**

[54] FLOOR TYPE ADVERTISING APPARATUS

[76] Inventor: George W. Plumly, 3451 Boston Ave., Boston Bldg., Fort Worth, Tex. 76116

[ * ] Notice: The portion of the term of this patent subsequent to Dec. 1, 2009 has been disclaimed.

[21] Appl. No.: 962,465

[22] Filed: Oct. 16, 1992

Related U.S. Application Data

[63] Continuation-in-part of Ser. No. 707,695, May 30, 1991, Pat. No. 5,167,087, which is a continuation-in-part of Ser. No. 609,195, Nov. 5, 1990, abandoned.

[51] Int. Cl.[5] ..................... G09C 7/04

[52] U.S. Cl. ..................... 40/600; 40/611

[58] Field of Search ..................... 40/600, 611, 594, 595, 40/156; 52/DIG. 4, 384, 395, 393, 108

[56] References Cited

U.S. PATENT DOCUMENTS

| | | | |
|---|---|---|---|
| 5,167,087 | 12/1992 | Plumly | 40/600 |
| 5,248,563 | 9/1993 | Du Kotz | 40/638 X |

*Primary Examiner*—Kenneth J. Dorner
*Assistant Examiner*—C. Davis
*Attorney, Agent, or Firm*—Arthur F. Zobal

[57] ABSTRACT

A cavity is formed in the floor of a building for receiving the floor type advertising apparatus. A lower holding layer of magnetic material having an opening formed therethrough is located and secured in the lower portion of the cavity. An upper holding layer of magnetic material having an opening formed therethrough is attached to the lower side of a transparent layer and both the transparent layer and the upper holding layer are located in the cavity to allow the magnetic lines of force from the holding layers to removably secure the transparent layer and the upper holding layer to the lower holding layer in the cavity. A support layer is secured to the floor of the cavity within the opening of the lower holding layer for supporting an advertising layer. One side edge of the upper holding layer is bonded to one side edge of the lower holding layer whereby the other side edge of the upper holding layer with the transparent layer may be lifted from the lower holding layer and folded back to allow insertion or removal of the advertising layer.

28 Claims, 11 Drawing Sheets

131MU1
159
131ML1
29
133
161
134
141
131MU
157
155
S
N
S
N

S1
133
153
141
29
151
S2
131MU
131ML
21

FLOOR TYPE ADVERTISING APPARATUS

This application is a continuation-in-part of U.S. patent application Ser. No. 07/707,695, filed May 30, 1991, which is a continuation-in-part of U.S. patent application Ser. No. 07/609,195 filed on Nov. 5, 1990, now abandoned.

BACKGROUND OF THE INVENTION

1. Field of the Invention

The invention relates to the use of magnetic material to secure advertising medium in a cavity in a floor.

2. Description of the Prior Art

Magnetic material has been used for attaching advertising signs or information to metal doors. The known devices are either sheets of magnetic material having the sign incorporated thereon or the use of individual magnets for holding paper or the like to a door. These devices, however, project outward from the door and are not suitable for use for floor advertisement purposes on floors subject to foot traffic. Moreover, a sheet of magnetic material having a sign incorporated therein is a custom type single purpose system and is too expensive for advertisement purposes where the advertisement is changed often.

U.S. Pat. No. 4,907,361 discloses a ground advertising panel which appears to be complicated and expensive.

Summary of the Invention

It is an object of invention to provide an effective, simple, and economical floor type advertisement apparatus held in place by magnetic material which allows the advertising medium to be readily changed when desired, and which is not affected by water or pedestrian traffic.

The invention is particularly useful in food stores or fast food establishments where the advertisement is changed often.

The floor advertisement apparatus of the invention is used in a cavity formed in the floor of a building or the like. A lower holding layer is located and secured in the bottom of the cavity. An advertising layer is located in the cavity with the upper side of the advertising layer having desired advertisement thereon. An upper holding layer with an opening formed therethrough is provided. In addition, a transparent layer is provided having one side secured to one side of the upper holding layer. The transparent layer and the upper holding layer are located in the cavity with the lower side of the upper holding layer facing the lower holding layer and the upper side of the transparent layer facing upward. The opening formed through the upper holding layer is sufficient to allow the desired advertisement to be seen through the opening and through the transparent layer when viewed from above. Both of the holding layers comprises magnetic material forming magnetic lines of force for removably holding the upper layer to the lower layer when the two layers are located next to each other such that the advertising layer and the transparent layer are removably held in the cavity.

In the preferred embodiment, the upper holding layer is bonded to the lower holding layer on one side whereby the other side of the upper holding layer with the transparent layer may be lifted from the lower holding layer and folded back to allow insertion or removal of the advertising layer.

In these Figures, the components are not drawn exactly to scale.

DETAILED DESCRIPTION OF THE INVENTION

Figure 1:
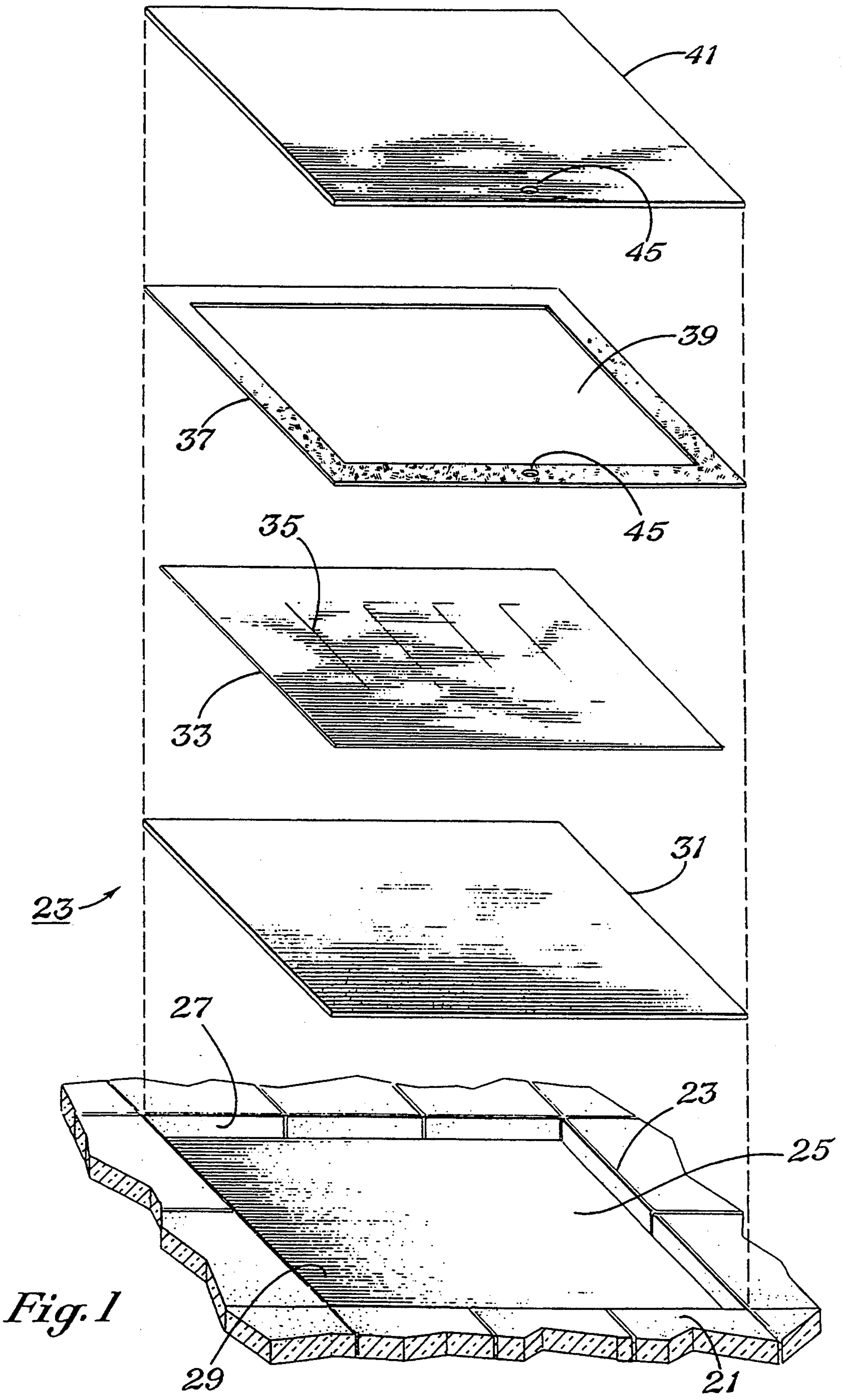
FIG. 1 is an exploded view of the floor advertising apparatus of one embodiment.
Figure 2:
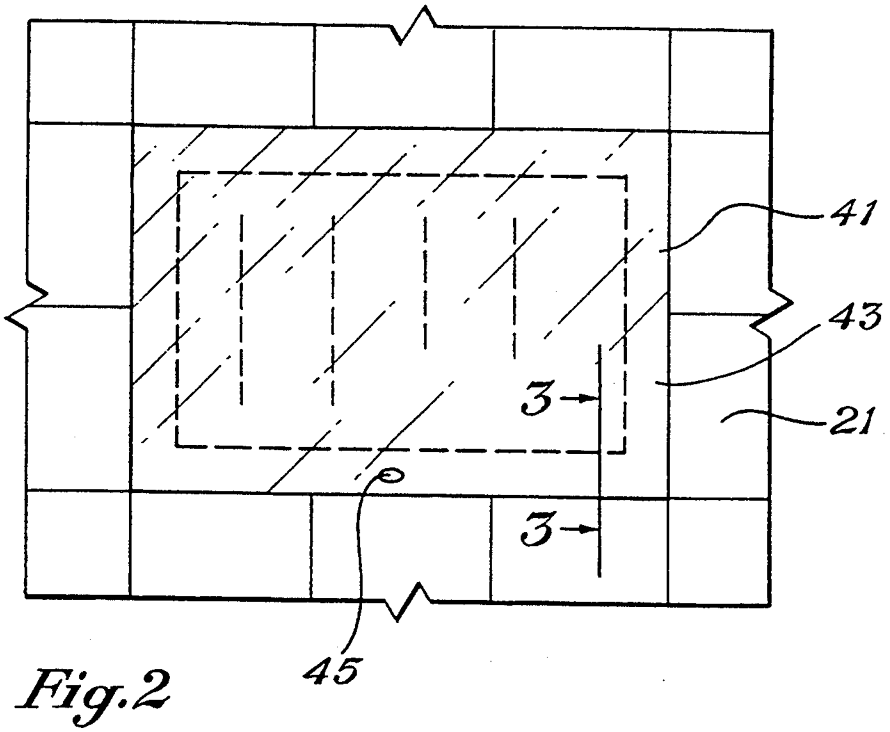
FIG. 2 is a top view of the floor advertising apparatus secured in place in a cavity formed in a floor.
Figure 3:
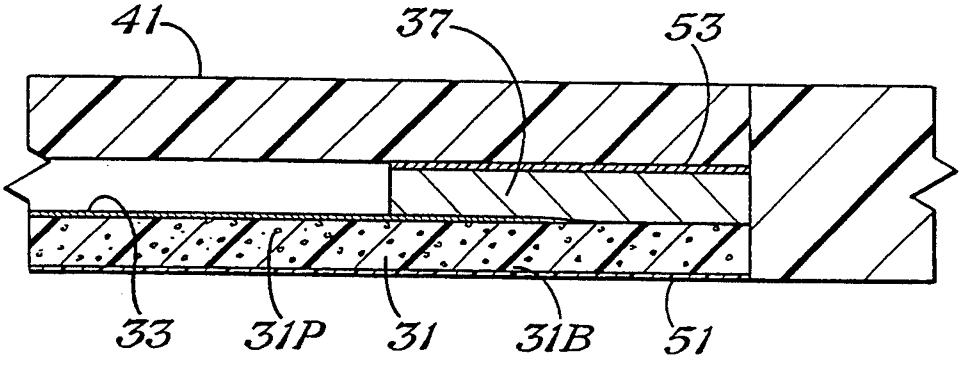
FIG. 3 is an enlarged cross section of FIG. 2 taken along the lines 3—3 thereof.

Referring now to FIGS. 1–3 of the drawings, there is illustrated a conventional tile floor 21 formed in buildings or establishments and which comprises square tiles 23 which may be for example vinyl tiles or ceramic tiles. The embodiment of FIGS. 1–3 will be described with respect to vinyl tiles which have a thickness of about $\frac{1}{8}$ of an inch. As shown, six tiles have been removed from the floor forming a cavity 25 defined by the edges 27 of the surrounding tiles and the base floor 29 of the building which may be of concrete. The advertising apparatus of one embodiment comprises a lower holding layer 31, an advertising layer 33 having advertisement 35 on its top side; an upper holding layer 37 having a rectangular opening 39 formed therethrough and a transparent layer 41 having a surrounding border 43 formed on its lower side by a silk screen process. A small opening 45 is formed through the layers 41 and 37. In one embodiment, the lower holding layer 31 comprises magnetic material. Such material is available commercially in sheet form or tape form and comprises a thermal plastic binder 31B with particles 31P of barium ferrite powder embedded therein to form magnetic lines of force which will attract metal. In the embodiment of FIGS. 1–5 the layer 31 is in sheet form. The advertising layer 33 is formed of a thin sheet of paper which does not materially affect the magnetic lines of force. The upper holding layer 37 is formed of galvanized steel which is attracted by the magnetic lines of force produced by the magnetic material 31. The transparent layer 41 may be formed of polyvinyl chloride (PVC). The total thickness of the four layers is about ⅛ of inch. In installing the advertising apparatus, the magnetic material layer 31 is located and secured in the cavity with a suitable glue or adhesive or double faced tape 51 to bind it to the base 29. The magnetic layer 31 has slightly smaller dimensions than that of the cavity 25 to allow the layer 31 to snugly fit within the cavity. The advertising layer 33 next is placed on the top surface of the layer 31 with its advertisement 35 facing upward and the layers 37 and 41 are inserted in the cavity. The length and width of the advertising layer 33 is smaller than the length and width of the magnetic layer 31. The layer 37 has a width and length substantially the same as that of the layer 31 such that when the bottom surface of the layer 37 is located on the top surface of the layer 33, the edges of layer 37 will extend beyond the edges of the advertising layer 33 to allow the lower peripheral surface of the layer 37 to directly contact the upper peripheral surface of the layer 31 to allow the layers 31 and 37 to be magnetically attracted together and to form a seal between the peripheral surfaces of the layers 31 and 37 to prevent water from leaking to the advertising layer 33. The width and length of the transparent layer 41 is substantially the same as the width and length of the layer 37 respectively and the bottom peripheral surface of the layer 41 and the upper surface of the layer 37 are glued or bonded together with a commercial adhesive or glue or double faced tape 53. The layers 37 and 41 fit snugly within the cavity such that they cannot move latterly. When the transparent layer 41 is located in the cavity above the advertising layer 33, the desired advertising material is viewable through the opening 39 of layer 37 and through the transparent center portion 47 formed within the border 43. The purpose of the border 43 is to hide the layer 37. Thus people can walk on the transparent layer 41 without affecting the advertisement thereunder or without causing damage to the system. Water spilled on to the tile cannot seep to the advertising layer 33 due to the peripheral seal formed between the layer 37 and 31. The aperture 45 can be sealed with wax which can be readily moved. The purpose of the aperture 45 is to allow one to remove the layers 37 and 41 to allow the advertising layer 33 to be readily changed. Removal can be readily accomplished by inserting a hook shaped member through the aperture 45 and lifting the layers 41 and 37 out of the cavity to allow replacement of the layer 33. A dimple may be formed in the top surface of layer 31 corresponding in position with aperture 45 to facilitate removal of layers 41 and 37 with the hook.

If the advertisement is large, the layer 31 may be formed with magnetic tape to form a frame with a central opening to minimize cost of the magnetic material.

In one embodiment, the magnetic material layer 31 may have a thickness of 0.030 of an inch; the advertising layer 33 may have a thickness of about 0.004 of an inch; the metal layer 37 may have a thickness of about 0.030 of an inch; the transparent layer 41 may have a thickness of about 0.020 of an inch; and the glue or tape layers 51 and 53 each may have a thickness of about 0.010 of an inch such that the total thickness is slightly less than or equal to ⅛ of an inch which is the height of conventional vinyl floor tile. Layers 37 and 41 together form a combined flexible layer sub-assembly. The vinyl tiles are conventional and each may be twelve inches square or have different square dimensions.

As an alternative, the layer 31 may be formed of metal (galvanized steel) and the layer 37 formed of the magnetic material (magnetic tape). In this embodiment, the metal layer 31 will be bonded to the base surface 29 and the magnetic layer 37 will be bonded to the lower side of the transparent layer 41. In this alternative, layers 37 and 41 together also form a combined flexible layer sub-assembly.

Figure 5:
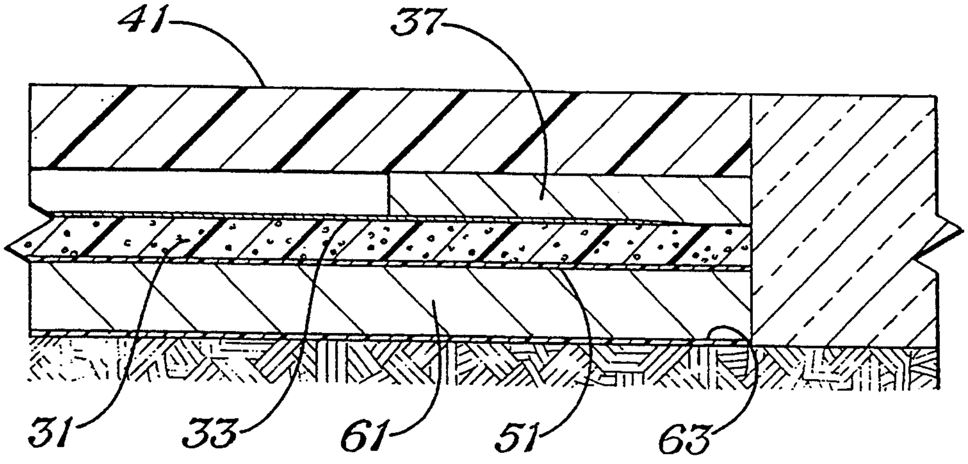
FIG. 5 is a cross section similar to that of FIG. 2 but illustrating a lower filler layer used in deeper cavities.
Figure 4:
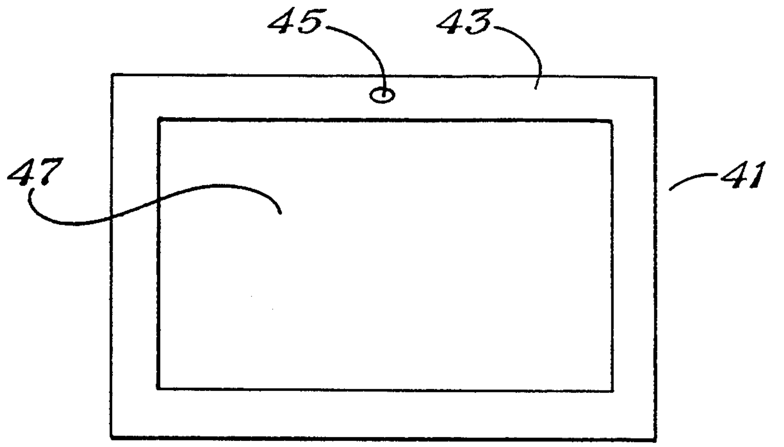
FIG. 4 illustrates the lower side of the transparent layer employed in the apparatus.

If it is desired to install the system in a ceramic floor, the ceramic tiles will be removed as are the vinyl tiles and a filler material 61 inserted in the bottom as illustrated in FIG. 5 to insure that the top surface of the layer 41 is flush with the top surface of the ceramic tile floor. This filler layer 61 may be formed of conventional particle board and bonded to the floor 29 with glue, or adhesive 63.

Referring now to the embodiment of FIGS. 6 and 7, there will be described another embodiment of the apparatus. In this embodiment, like reference characters identify the same components as in the embodiments of FIGS. 1–5. A polyethylene sheet 71 is provided which is secured to the magnetic material layer 31M by adhesive or by double faced tape 51. The magnetic material layer 31M is modified in that it is formed with magnetic tape comprising a thermal plastic binder 31B in which are embedded the magnetic particles 31P. The tape is formed into a frame having a central opening 31(O) extending therethrough. The exterior dimensions of the layers 31M and 71 are the same and fit snugly in the cavity 25. The advertising layer 33 has dimensions such that it will fit into the opening 31(O). The metal layer 37 (galvanized steel) is secured to the bottom side of the transparent layer 41 with adhesive or double faced tape 53 forming a combined flexible layer sub-assembly. In assembling the system, the sub-assemble comprising the polyethylene layer 71 and the magnetic layer 31M are inserted into the cavity 25 with the bottom of the polyethylene layer 71 secured to the base 29 of the cavity with adhesive or with double faced tape 81. If the cavity 25 is formed in a vinyl tile flooring, heat may be used to remove the tiles and the remaining adhesive in the cavity will be heated and used to secure the polyethylene layer 71 in place. Next the advertising layer 33 is inserted into the opening 31(O) and the sub-assembly comprising the metal layer 37 and the transparent layer 41 are inserted into the cavity with the bottom of metal layer 37 engaging the top side of the magnetic layer 31M such that the magnetic layer 31M removably secures (by magnetic attraction) the metal layer 37 and hence the transparent layer 41 in place in the cavity. When it is desired to replace the advertising layer 33, a sharp tool can be inserted in the aperture 45 formed through the transparent layer 41 to lift the transparent layer 41 and the metal layer 37 out of the cavity to allow the advertising layer 33 to be removed and a new advertising layer inserted within the opening 31(o) and then the sub-assembly 37 and 41 inserted in the cavity. The polyethylene layer 71 is white in color and is preferred as a base upon which the advertising layer 33 is seated.

Figure 7:
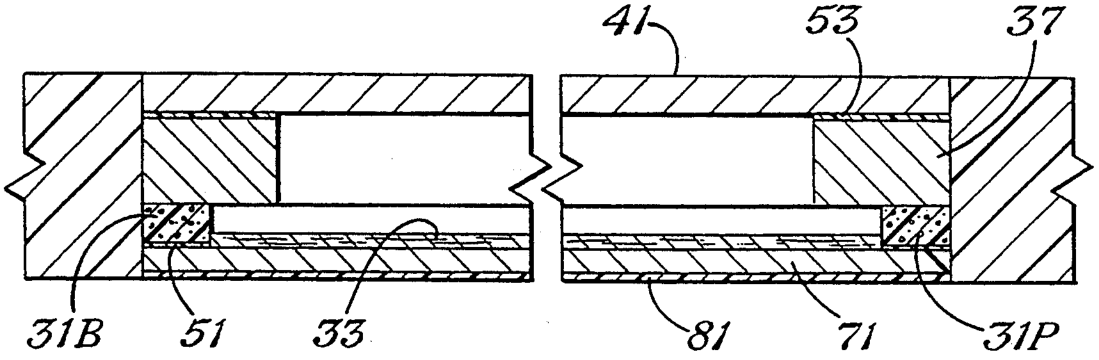
FIG. 7 is an enlarged partial cross section of the apparatus of FIG. 6 located in place in a floor cavity.
Figure 6:
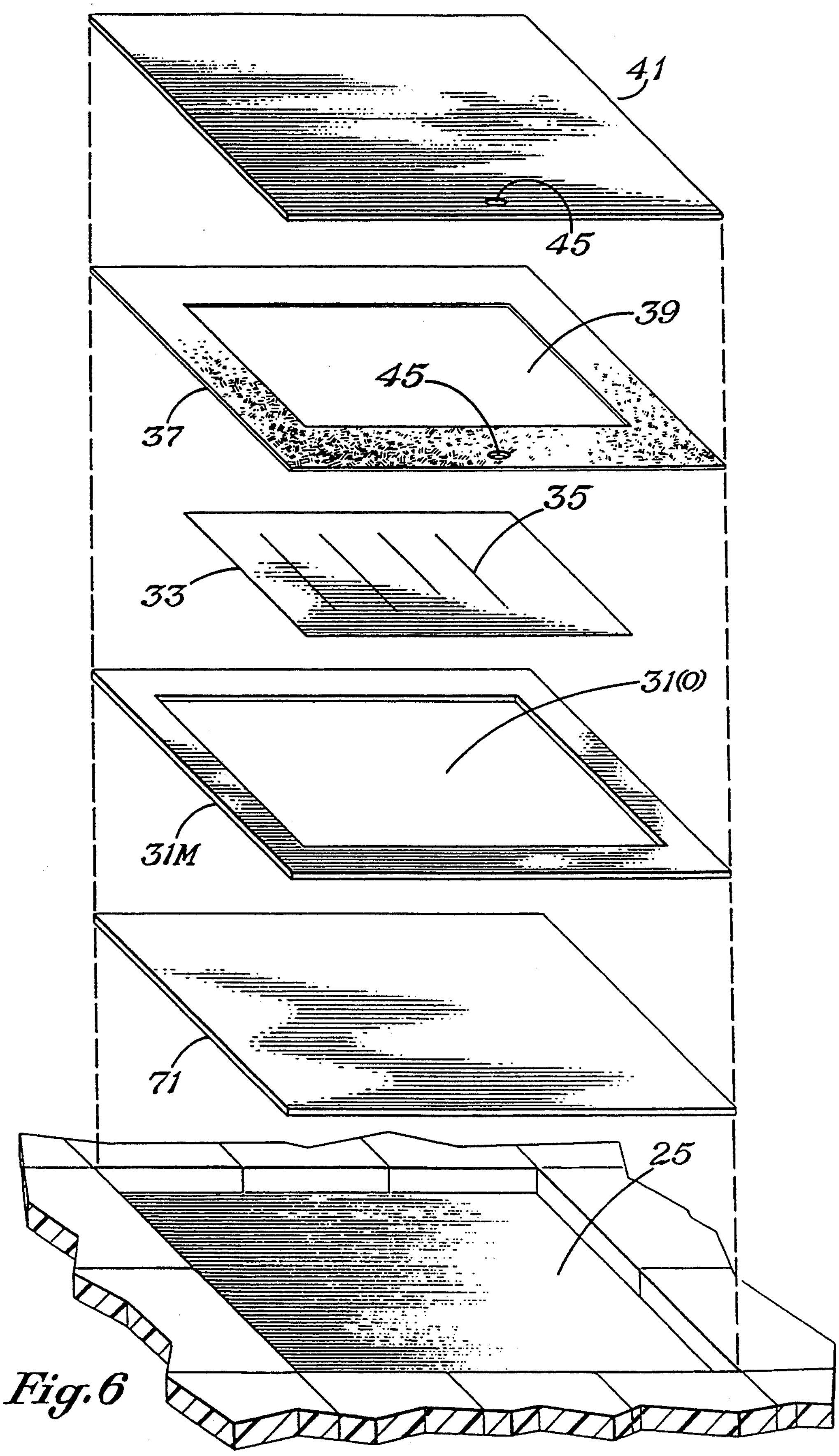
FIG. 6 is an exploded view of another embodiment of the floor advertising apparatus.

In one embodiment of the apparatus of FIGS. 6 and 7, the polyethylene layer 71 has a thickness of about 0.015 of an inch; the magnetic layer 31M has a thickness of about 0.030 of an inch; the metal layer 37 has a thickness of about 0.030 of an inch; and the transparent layer 41 has a thickness of about 0.020 of an inch. The glue or tape layers 81, 51, and 53 each may have a thickness of about 0.010 of an inch. The total thickness of the assembly is equal to or slightly less than the thickness of the conventional vinyl floor tile. In one embodiment, the width of the frame of the magnetic layer 31M is one inch and the width of the frame of the metal layer 37 is two inches.

Figure 8:
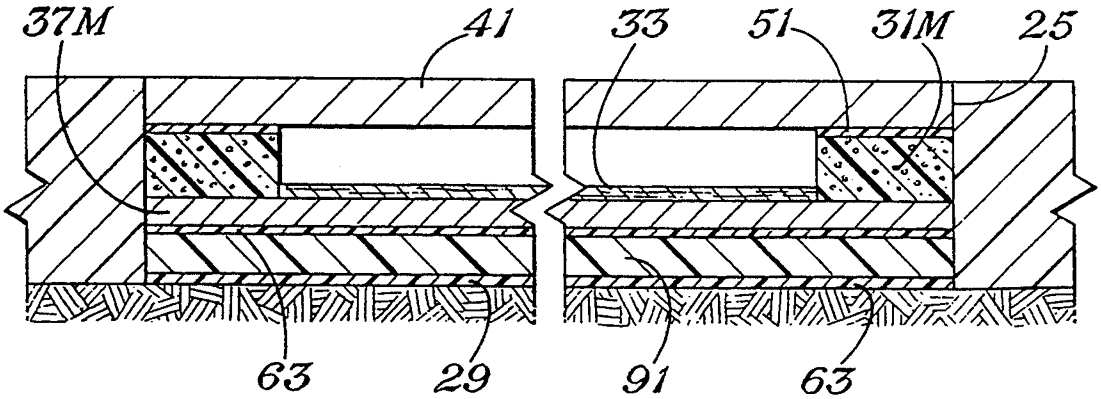
FIG. 8 is an enlarged partial cross section of another embodiment of the apparatus.

Referring to FIG. 8, there will be described another embodiment wherein the metal layer is located and secured to the bottom of the cavity and the magnetic material is bonded to the bottom side of the transparent layer. In this embodiment, like reference characters identify the same components as described in FIGS. 1–7. In the cavity, a polystyrene layer 91 is bonded to the cavity bottom 29 with glue, adhesive, or double sided tape 63. Next a solid galvanized steel sheet 37M is bonded to the polystyrene layer 91 with glue, adhesive, or double sided tape 63. The layers 91 and 37M have the same dimensions and fit snugly within the cavity 25. The advertising layer 33 is inserted on the top surface of the metal layer 37M. The transparent layer 41 has the border 43 formed on its back side with a silk screen process and bonded to the border is the magnetic layer 31M formed of magnetic tape as described above. Bonding is with a glue, adhesive, or double sided tape 51. The dimensions of the advertising layer 33 are such that the layer will fit within the opening 31(O) formed through the magnetic layer 31M. The magnetic lines of force from the magnetic material layer 31M removably secure the transparent layer 41 and the magnetic layer 31M in the cavity by the magnetic lines of force attracting the magnetic layer 31M to the galvanized steel layer 37M. The transparent layer 41 and the magnetic layer 31M can be readily removed by inserting a hook through the aperture 45 and removing these layers to allow the advertisement 33 to be changed or replaced. In this embodiment, the polystyrene layer 91 may have a thickness of about 0.020 of an inch; the metal layer 37M may have a thickness of about 0.017 of an inch; the magnetic layer 31M may have a thickness of about 0.030 of an inch; and the transparent layer 41 may have a thickness of about 0.020 of an inch. Layers 41 and 37M form a combined flexible layer sub-assembly. The use of the glue, adhesive, or double sided tape will build the assembly to a total thickness of about, or slightly less than, ⅛ of an inch which is the thickness of the conventional vinyl floor tile.

Figure 9:
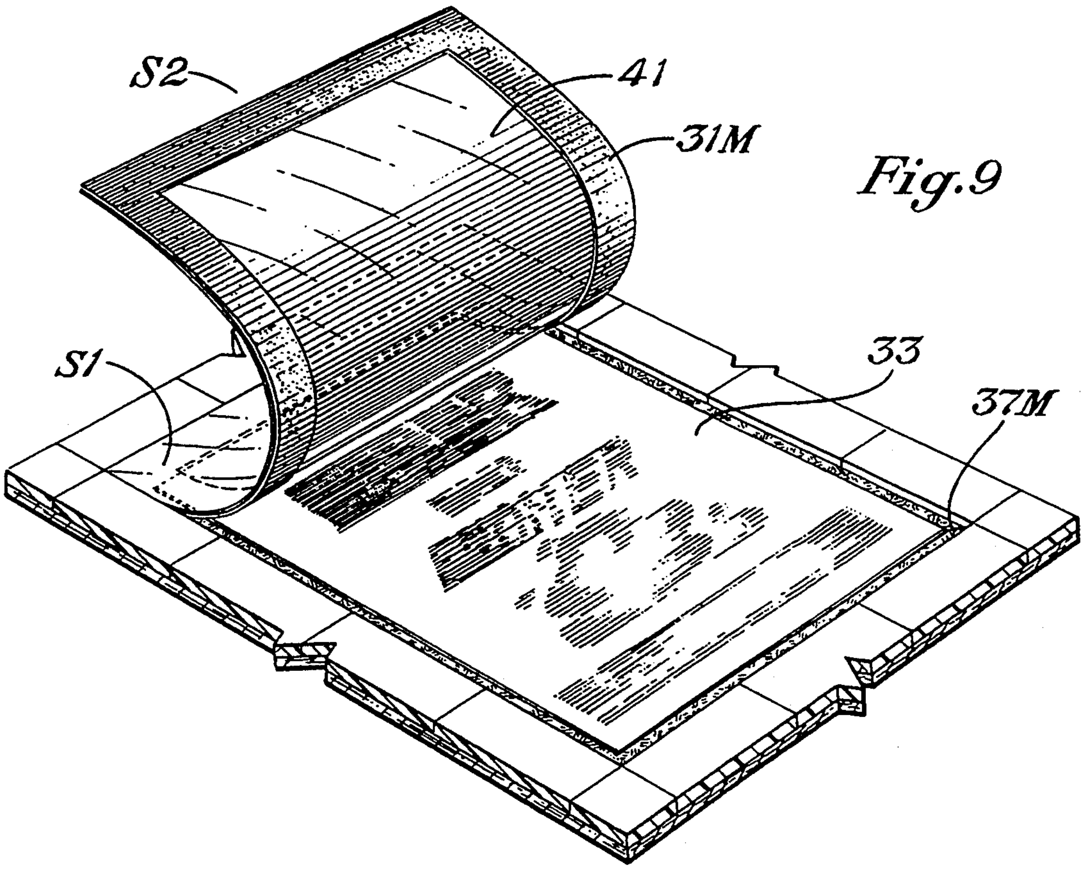
FIG. 9 illustrates still another embodiment of the apparatus.
Figure 10:
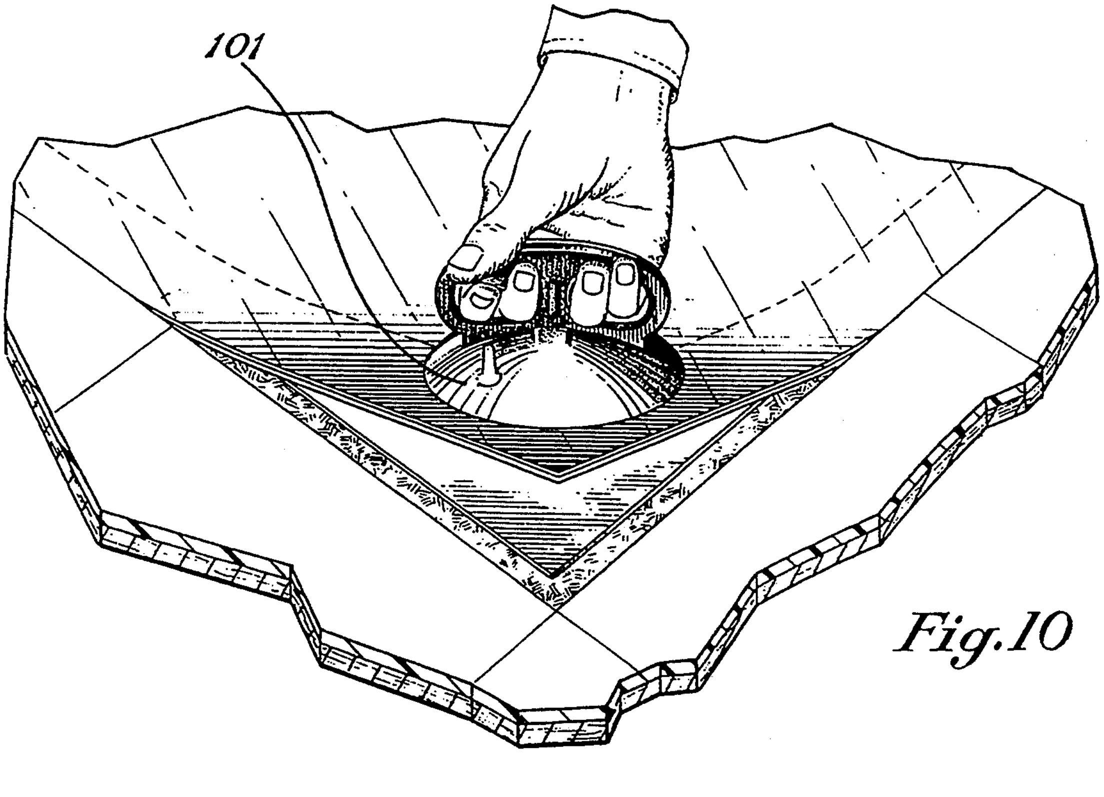
FIG. 10 illustrates a suction cup for removing the outer layers of the apparatus.
Figure 11:
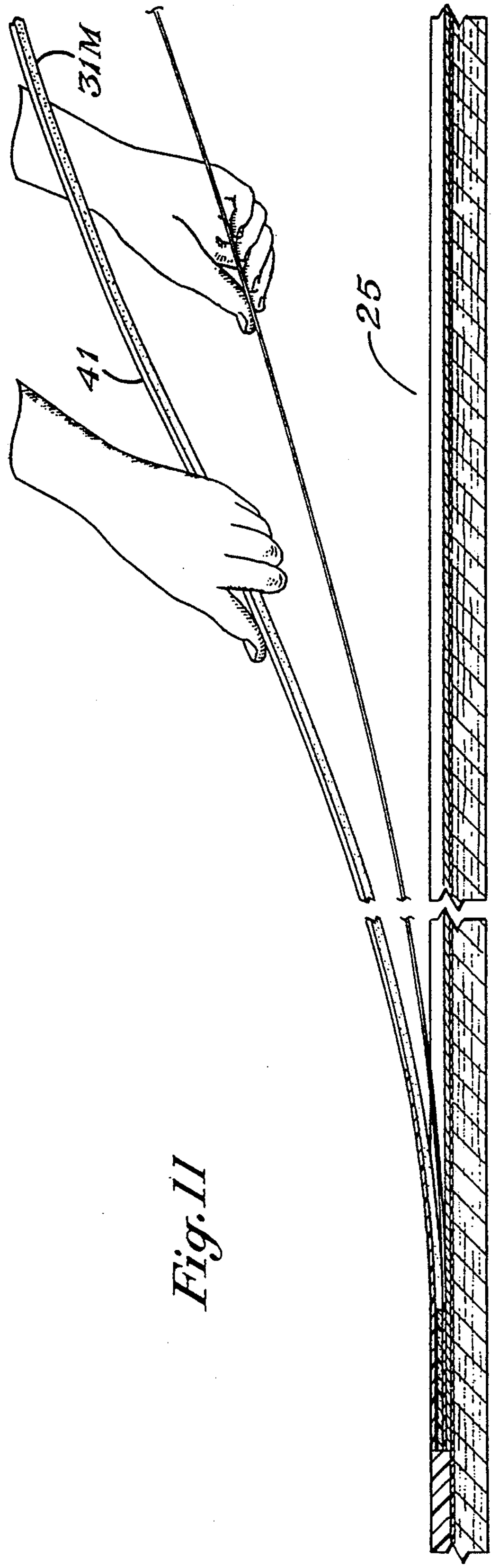
FIG. 11 is a cross-sectional view of a portion of the embodiment of FIG. 9.
Figure 12:
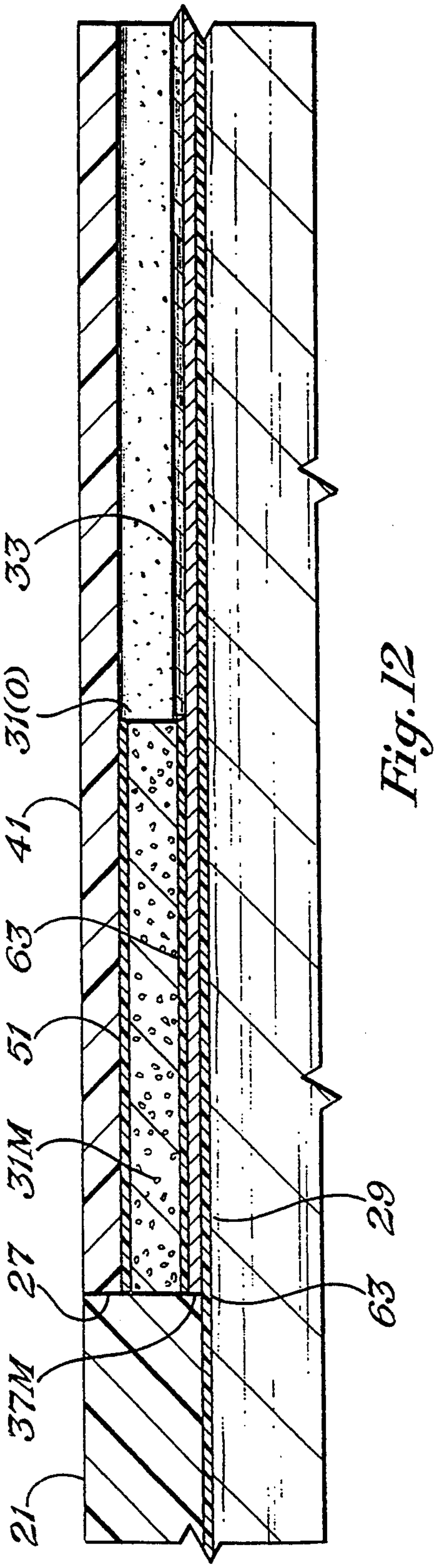
FIG. 12 is an enlarged cross-sectional view of a portion of FIG. 11.

Referring now to FIGS. 9–12, there will be described another embodiment which is similar to that of FIG. 8. In the embodiment of FIGS. 9–12, like reference characters identify the same components as described in FIG. 8. In the embodiment of FIGS. 9–12, a galvanized steel sheet 37M is bonded to the cavity bottom 29 with glue, adhesive, or double sided tape 63. Layer 37M fits snugly within the cavity 25. The advertising layer 33 is inserted on the top surface of the metal layer 37M. The transparent layer 41 has the border 43 formed on its lower side with a silk screen process and bonded to the border is the magnetic layer 31M formed of magnetic tape in a frame having a rectangular opening 31(O) as described above. Bonding is with a glue, adhesive, or double sided tape 51. The layers 41 and 31M form a flexible layer sub-assembly. The dimensions of the advertising layer 33 are such that the layer will fit within the opening 31(O). One side S1 of the layer 31M has its lower end bonded to the metal layer 37M with glue, adhesive, or double sided tape 63 such that layers 41 and 31M can be folded back toward side S1 for exposing the metal layer 37M for receiving and/or allowing removal of the advertising layer 33. This arrangement has been found to be desirable since it allows the other three sides of the sub-assembly 41, 31M to readily fit in the cavity for covering and sealing the advertising layer 33. Due to the strong magnetic attraction between layers 31M and 37M, it has been found that it is difficult to quickly place the layers 41, 37M in the cavity 25 if they are held in place only by the magnetic attraction between layers 31M and 37M. For example, if the layers 41, 31M are not accurately dropped into the cavity and one or two edges overlap the top surface of the tile, it is difficult to slide the layers 41, 31m into the cavity. This problem is avoided by bonding one side S1 of layers 41, 31M in the cavity allowing the other three sides to drop into the cavity 25 for covering and sealing the advertising layer 33. For removal and insertion of a new advertising layer, the opposite free side S2 can be readily pulled up with a suction cup 101 as shown in FIG. 10, and folded backward toward side S1 for insertion and/or removal of the advertising layer 33 as shown in FIG. 9. The suction cup 101 also can be used for removing the top two layers of the embodiments of FIGS. 1–8 eliminating the apertures 45.

In the embodiment of FIGS. 9–12, the layer 41 is formed of flexible polycarbonate which can be polished to a high shine, is chemical resistant yet is very strong. If the layer does happen to be marred, it can be replaced by applying force thereto to break the bond 63 between layer 31M and 37M at the side S1. Layer 37M has a thickness of about 0.017 of an inch, layer 31M has a thickness of about 0.060 of an inch and layer 41 has a thickness of about 0.025 of an inch. This total thickness plus the thickness of the two bonding layer 63 and bonding layer 51 locate the layer 41 at the same height or slightly below the top surface of conventional vinyl tile 21 which has a thickness of about ⅛ of an inch. Thus removal of the desired number of tiles from the floor and insertion of the apparatus of FIGS. 9–12 in the cavity forms a durable non-hazardous advertising media which allows the advertisement to be readily changed. Layer 33 may have a thickness of about 0.005–0.010 of an inch. The width of each of the fame sides of layer 31m is about one inch and the width of each of the sides of the border 43 is two inches.

Figure 13:
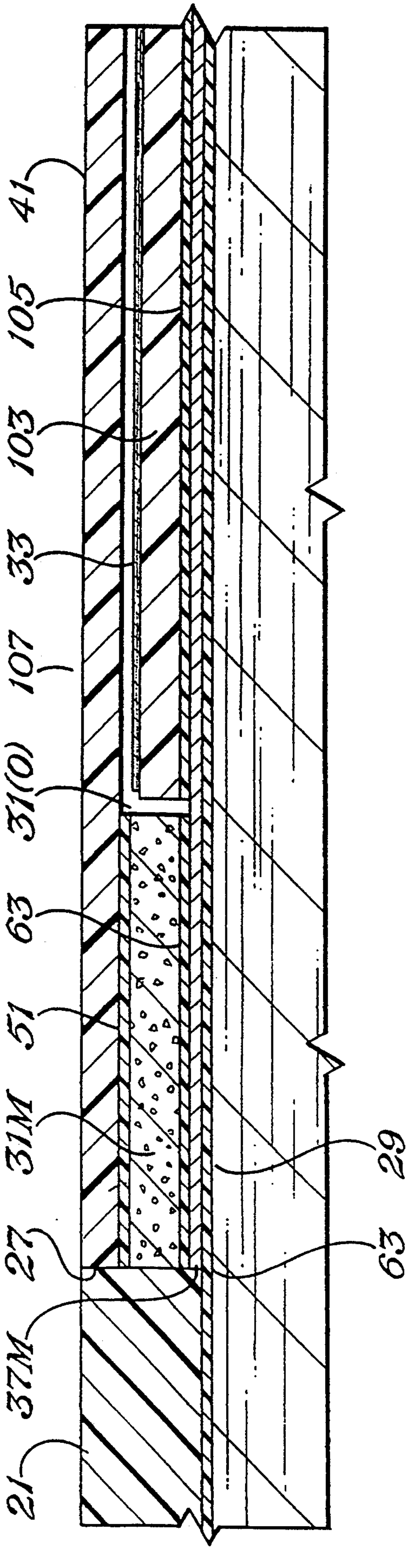
FIG. 13 illustrates a modification of the embodiment of FIGS. 9–12.
Figure 14:
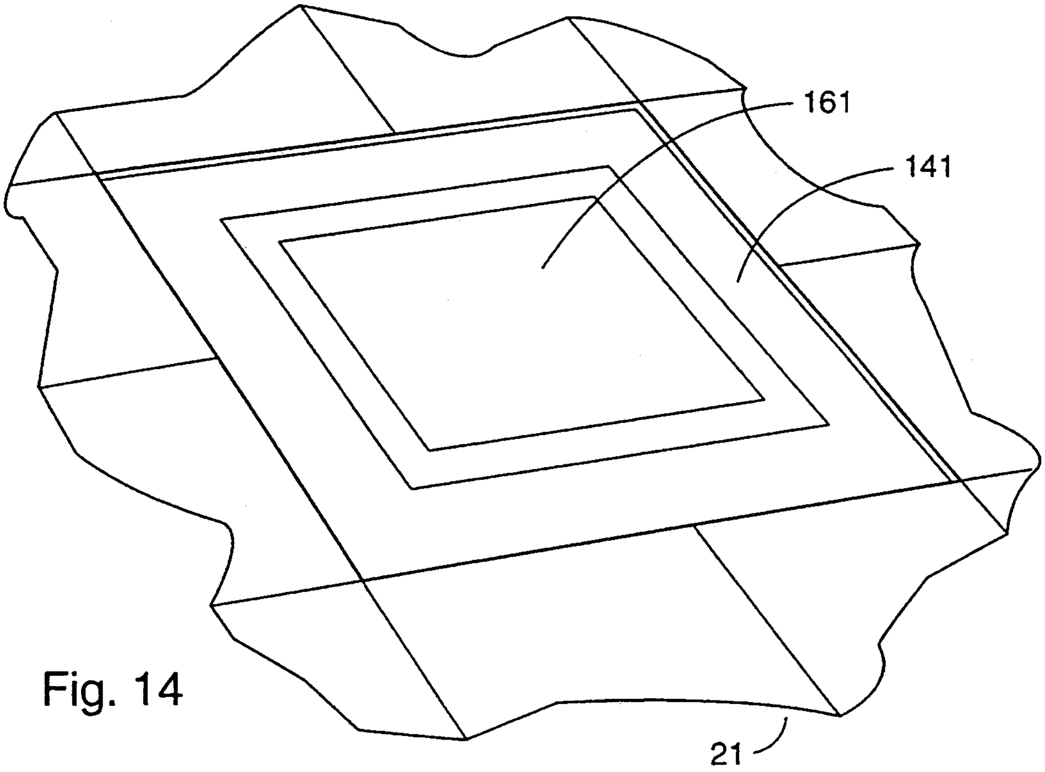
FIGS. 14 and 15 illustrate another embodiment of the apparatus of the invention.

Referring to FIG. 13, the embodiment therein is the same as that of FIGS. 9–12 except that a styrene layer 103 is bonded by adhesive 105 to the top of layer 37M within the area formed by the frame sides of layer 31M when in place to prevent customer heels from breaking the top layer 41 at the position 107 along the inner edge of the frame layer 31M. The styrene layer 103 has a thickness of about 0.040 of an inch and minimizes the inward bending of layer 41 when stepped on by a person. The top surface of layer 103 supports the advertising layer 33.

As a modification of the embodiment of FIG. 13, the metal layer 37M can be formed in a rectangular frame having a rectangular opening with frame side widths of two inches such that the inside edges of the metal frame can be bonded by adhesive, glue, or double sided tape 63 to the bottom outside edges of the styrene layer 103. The outer bottom edges of layer 103 will rest on and be bonded to the upper inner edges of the frame layer 37M. The frame layer 37M can be formed from four L-shaped galvanized steel members cut from a roll of galvanized steel to minimize costs.

In the embodiments of FIGS. 9–13, the assembly comprising layers 41, 31M, and 37M may be formed as a separate unit and transported to the place of installation and installed in the cavity formed by removing the appropriate number of vinyl tiles from the floor and bonded in place by bonding the bottom of the layer 37M to the bottom 29 with glue, adhesive, or double sided tape 63.

The magnetic tape and sheets may be purchased from the Magnetic Specialty Company, Inc., Marietta, Ohio 45750. This material has a strong side and a weak side such that the magnetic lines of force are stronger on the strong side than on the weak side. The strong side of the magnetic layers 31 and 31M will face the metal layer in the cavity. The double faced tape has adhesive on both sides and may be purchased from Can-Do, Inc., Nashville, Tenn. 37204. The glue or adhesive used in lieu of the tape may comprise rubber cement.

Although the metal layer was disclosed as being formed of galvanized steel, it could be formed of other materials attracted by magnetic lines of force.

Referring now to FIGS. 14–19, there will be described another embodiment of the apparatus of the invention for use in a cavity 25 formed the floor 21 by removing tiles to form the desired cavity 25 defined by the edges 27 of the surrounding tiles which may be ⅛ inch thick square vinyl tiles each having dimensions of 12 inches by 12 inches. The bottom of the cavity is defined by the concrete base 29 of the building. In the embodiment shown, four square tiles have been removed defining a square cavity 25.

The apparatus of the invention comprises a lower holding layer 131ML of flexible magnetic material having a central opening 131(OL), a flexible transparent layer 141 in sheet form of flexible plastic material, and an upper holding layer 131MU of flexible magnetic material having a central opening 131(OU). Also provided is a poly styrene layer 133 in sheet form cut to fit in the opening 131(OL) of layer 131ML and having a layer of colored tape 134 secured to its top side.

Figure 15:
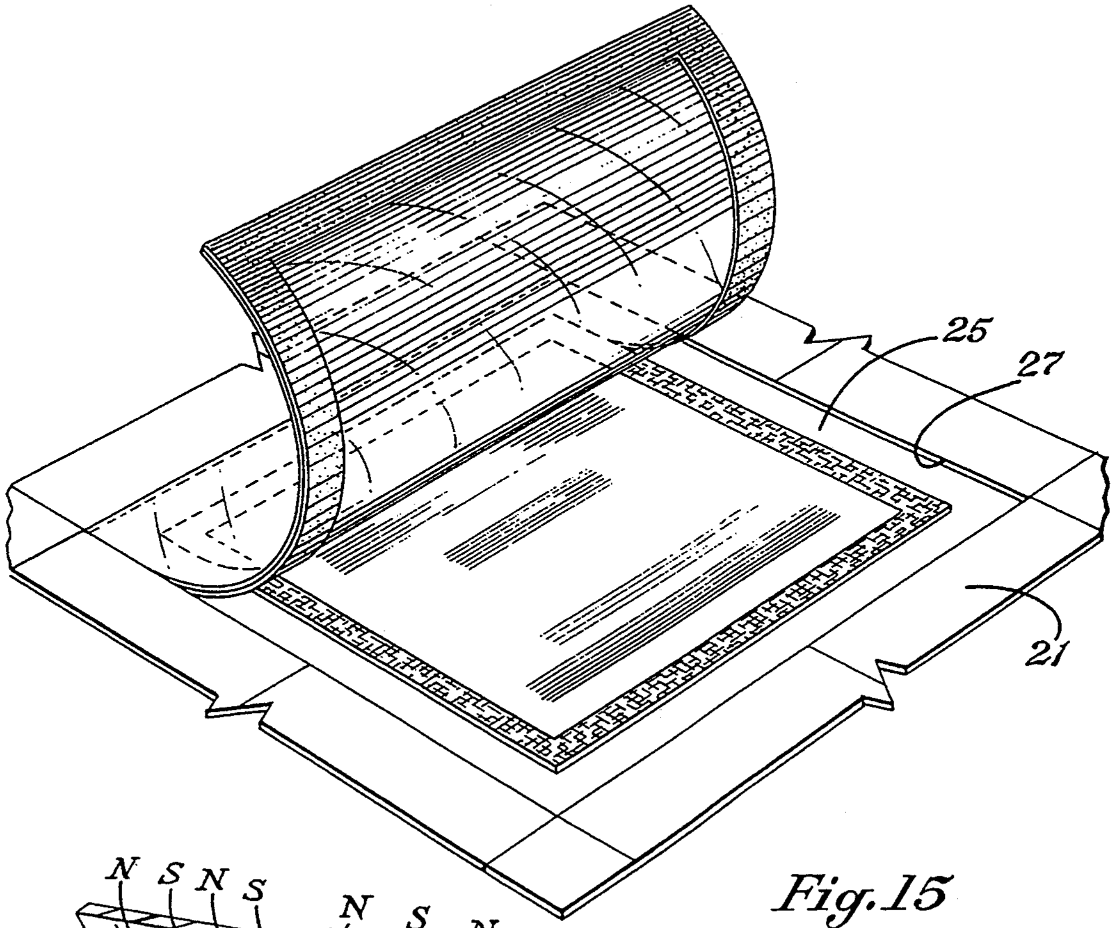
Figures 16, 17:
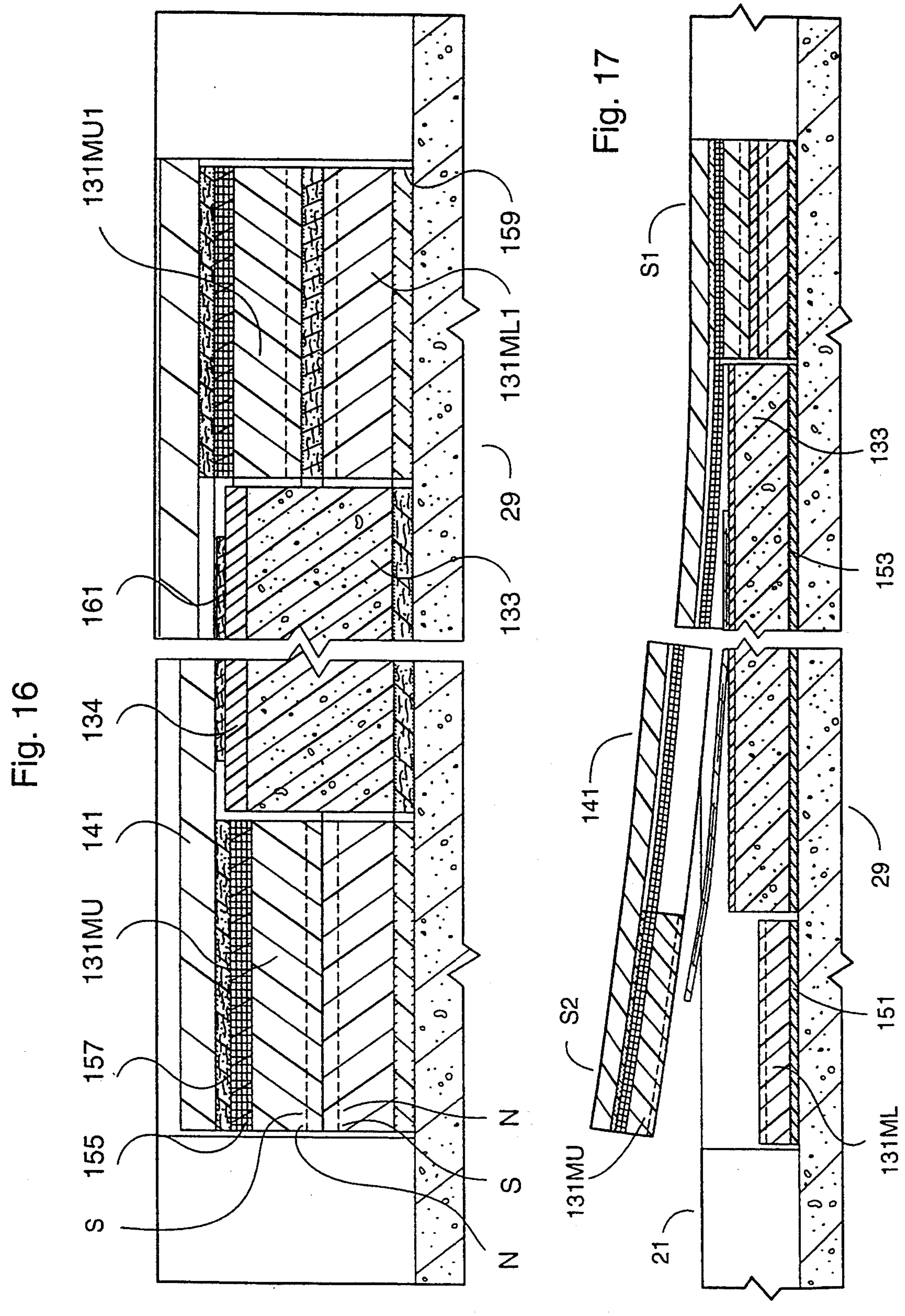
FIG. 16 is an enlarged partial cross-section view of the apparatus of FIGS. 14 and 15.
FIG. 17 is a partial cross-sectional view of the apparatus of FIGS. 14 and 15 with the upper holding and transparent layers partially open.
Figure 19:
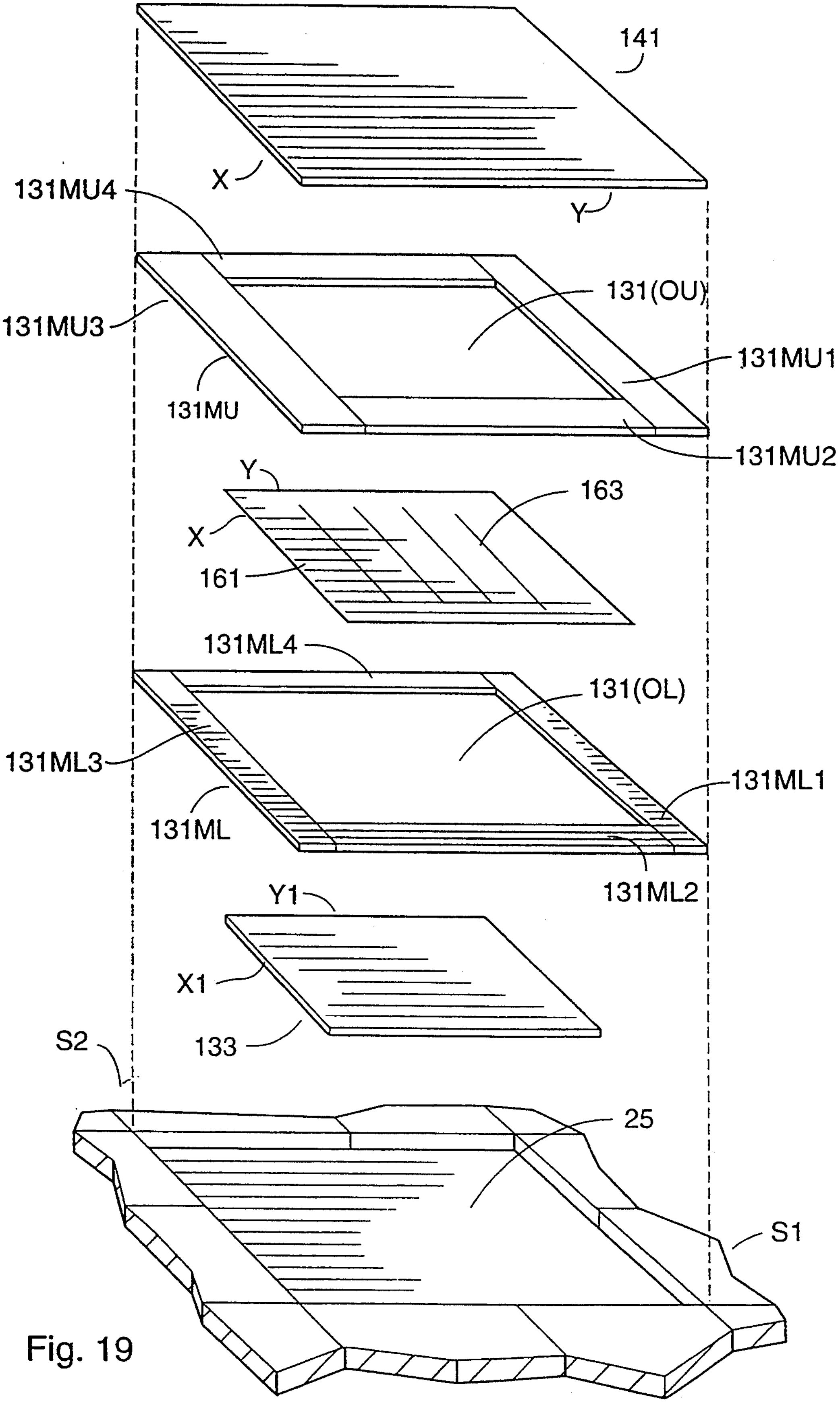
FIG. 19 is an exploded view of the apparatus of FIGS. 14–17.

The layer 131ML is bonded in the cavity 25 to the concrete floor 29 with adhesive tape 151 and the layer 133 is located in the opening 131(OL) of layer 131ML and bonded to the concrete floor 29 with adhesive tape 153. The tape 151 and 153 each is of the type that has adhesive on both sides. The dimensions of layer 133 are such that the layer 133 will fit in the opening of layer 131MU with a close fit between the edges of layer 133 and the edges of layer 131ML. The outside dimensions of layers 141, 131ML and 131MU are substantially the same. The top side of layer 131MU is secured to the bottom side of layer 141 with colored tape 155 having adhesive on its bottom side and transparent adhesive 157 on its top side. The color of tapes 134 and 155 may be the same. The bottom of one side edge 131MU1 of the layer 131MU at side S1 is bonded to the top of one side edge 131ML1 of layer 131ML with adhesive tape 159 such that the other side S2 of layers 131MU and 141 can be folded back toward side S1 as shown in FIG. 15 to allow an advertising layer 161 to be removed from the cavity or located on the top surface of layer 133. Tape 159 has adhesive on both sides. In FIG. 17 the advertising layer 133 is shown partially on the styrene layer 133. In FIG. 16, the advertising layer 161 is shown located on the styrene layer 133 and the layers 141 and 131MU are in their closed positions with layer 131MU adjacent and engaging layer 131ML such that the magnetic material in layers 131ML and 131MU holds the two layers together and forms a seal to prevent water from reaching the advertising layer 161 which may be of paper having advertising 163 on its top side. The styrene layer 133 has a height such that its top side is located closed to the top side of layer 131MU when in its closed position to prevent creasing or bending of the transparent layer 141 at the inner edge of magnetic layer 131MU when a person steps on the transparent layer 141. The styrene layer 133 also acts to hold the layers 131MU and 131ML in the cavity against rotary forces applied to the transparent layer 141 by the brushes of rotary cleaning or buffing machines.

The layers 141 and 131MU may be lifted at side S2 to remove or insert an advertising layer 161 from or on the styrene layer 133 by applying the suction device 101 of FIG. 10 against the top of transparent layer 141 at side S2 and pulling upward to remove the layers 141 and 131MU from the cavity at the side S2 and folding side S2 toward side S1 as shown in FIG. 15.

Layers 131MU and 131ML are formed of a flexible plastic in sheet or strip form having magnetic particles embedded therein. The use of the magnetic material for both of the holding layers 131MU and 131ML has advantages over the use of magnetic material and steel as the two holding layers in that the magnetic holding force can be increased about 3 ½ times and the total overall thickness of the apparatus can be reduced to insure that its height in the cavity is about level (or slightly less) than the level of the tiles 21 of the floor. It is important in that increased holding forces be obtained against strong rotary forces of rotary cleaning and buffing machines. In addition, if the layer 141 is about level (or slightly lower) than the level of the floor, more protection is afforded against the strong rotary forces of rotary cleaning and buffing machines. For example, if the layer 141 extends too high above the level of the floor, the strong rotary cleaning and buffing machines are more likely to grab an edge of the layer 141 and cause damage to the apparatus.

Figure 18:
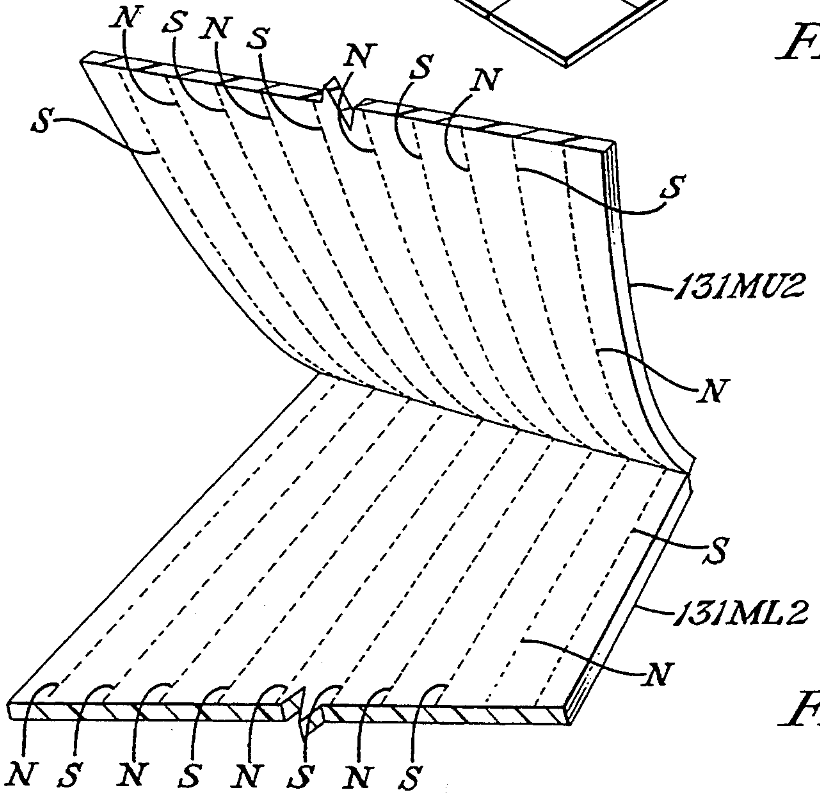
FIG. 18 illustrates the rows of magnetic material of the holding layers.

Layers 131MU and 131ML each comprise plastic material with magnetic particles embedded therein in alternate rows N and S such that the N rows produce a "North" magnetic force and the S rows produce a "South" magnetic force. Adjacent rows N and S are about ⅛ of an inch apart. The layer 131MU preferably is formed of four strips 131MU1, 131MU2, 131MU3 and 131MU4 secured together against the bottom of layer 141 such that the rows N and S extend parallel to the length of the strips. The layer 131ML preferably is formed of four strips 131ML1, 131ML2, 131ML3 and 131ML4 secured to the concrete floor 29 such that the rows N and S extend parallel to the length of the strips. Strips 131MU2 and 131MU2 are formed and located such that the N rows of strip 131MU2 are located next to the S rows of strip 131ML2 when the layer 131MU is in its closed position such that maximum magnetic attractive force is achieved. This is shown in FIG. 18. Similarly, strips 131MU3 and 131ML3 are formed and located such that the N rows of strip 131MU3 are located next to the S rows of strip 131ML3 when the layer 131MU is in its closed position; strips 131MU4 and 131ML4 are formed and located such that the N rows of strip 131MU4 are located next to the S rows of strip 131ML4 when the layer 131Mu is in its closed position; and strips 131MU1 and 131ML1 are formed and located such that the N rows of strip 131MU1 are located next to the S rows of strip 131ML1. The strips of layers 131MU and 131ML each have a strong side with strong magnetic lines of force and a weak side with weaker magnetic lines of force. The strips will be secured and located such that the strong sides of the strips of layer 131MU will face the strong sides of the strips of layer 131ML.

The top sides of the tape layers 134 and 155 may be the same or similar color such as gold or tan and gold respective. The advertising layer 161 will have dimensions X and Y which will be about ½ of an inch less than the dimensions X1 and Y1 of the styrene layer 133. This allows one to readily place the advertising layer 161 within the edges of the styrene layer 133 to avoid overlapping the layer 161 with layer 131ML which could reduce the magnetic forces between layers 131MU and 31ML when layer 131MU is in its closed position. By having both of the tape layers 134 and 155 of the same or similar color, the joint between the styrene layer and the tape 157 as seen through clear adhesive 155 and layer 144 will not be readily noticeable.

In one embodiment the adhesive tape 151 has a thickness of about 0.008 of an inch; layer 131ML has a thickness of about 0.035 of an inch; adhesive tape 159 has a thickness of about 0.005 of an inch; layer 131MU has a thickness of about 0.035 of an inch; tape 155 has a thickness of about 0.010 of an inch; adhesive layer 157 has a thickness of about 0.007 of an inch and layer 141 has a thickness of about 0.030 of an inch. Thus at side S1 the total thickness will be about 0.130 of an inch and at the other three sides, the total thickness is about 0.125 of an inch. Thus on all four sides, the thickness of the apparatus is about equal to that of a conventional ⅛ inch vinyl tile. The outer dimensions X and Y of layers 131ML, 131MU and 141 may be 24 inches by 24 inches. The width of each of the sides 131MU1, 131MU2, 131MU3, and 131MU4 of layer 131MU is 1 ½ inches and the width of each of the sides 131ML1, 131ML2, 131ML3, and 131ML4, of layer 131ML is 1 ½ inches. The total thickness of the styrene layer 131 including the tape 134 may be 0.070 of an inch. Adhesive tape 153 has a thickness of about 0.008 of an inch.

The tape 134 on the styrene layer 133 may be eliminated and the layer 133 dyed the desired color. In this embodiment, the styrene layer 133 may have a thickness of 0.07 of an inch. It may be dyed tan and the tape 155 may be gold.

The strips of magnetic material forming layers 131ML and 131MU may be purchased from Flex Mag of Maxietta, Ohio. The layers 131MU1, 131MU2, 131MU3, and 131MU4 when purchased has the tape 155 and adhesive 157 in place on one side of the layers with a pull off protective cover on the adhesive 157. The color of the tape 155 can be seen through the transparent adhesive 157 and the transparent layer 141. The layer 141 may be formed of flexible polycarbonate which is commercially available. The tape 153 and 151 are of the same type and may be purchased from Coating Sciences, Inc., Bloomfield Conn. This tape is known as U165 tape. The tape 159 may be purchased from 3M, Saint Paul, Minn. The tape 159 is known as high-low tape. It has an adhesive with more holding or sticking power on one side than the other and hence has a high holding side and a low holding side. The high side will be secured to the bottom of side 131MU1 of layer 131MU to allow the layer 131MU with the tape 159 to be readily removed, for replacement purposes, without leaving a residue on the top of layer 131ML1.

The unit including layers 141, 131MU and 131ML may be preassembled by bonding layers 141 and 131MU together with the tape 155 and adhesive 157 and then bonding the hinge sides 1341MU1 and 131ML1 together with the adhesive tape 159. The unit then may be secured in the cavity to the concrete floor 29 with adhesive 151 and the styrene layer located in the opening 131(OL) of layer 131ML and secured to the concrete floor 29 with adhesive 153.

Figure 20:
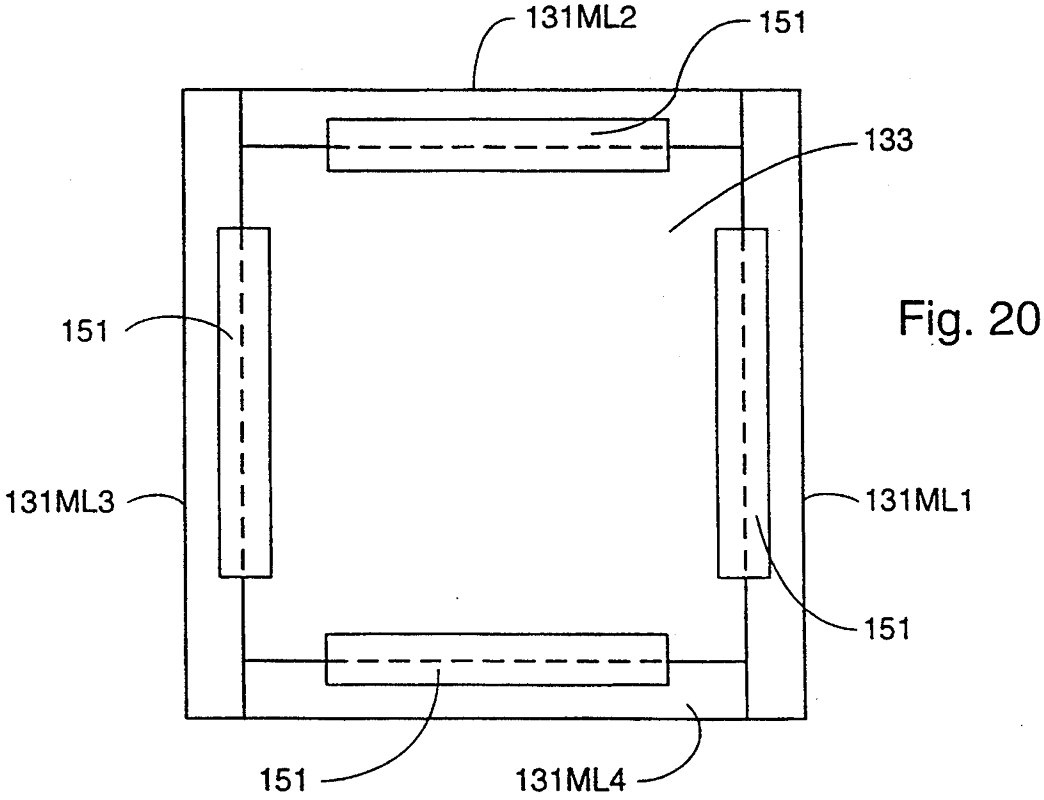
FIG. 20 illustrates the bottom side of an alternative embodiment of FIGS. 14–19.

As an alternative, as shown in FIG. 20, the tape 151 may be secured to the bottom sides of layers 131ML1, 131ML2, 131ML3, and 131ML4 and to the bottom side of styrene layer 133 to hold the layers 131ML1, 131ML2, 131ML3, and 131ML4 together and styrene layer 133 in the opening 131(OL) in the precise position desired. The layer 131MU and styrene layer 133 secured together with the tape pieces 151 on the bottom sides and with the layer 131MU secured to the top side of layer 131ML with the hinge tape 159, then is inserted into the cavity and the bottom sides of the layer 131ML and layer 133 secured to the concrete floor 29 with the tape pieces 151.

I claim:

1. A floor type advertising apparatus, comprising:
a floor,
a cavity formed in said floor,
said cavity having a lower portion,
a thin lower holding layer located in and secured in the lower portion of said cavity,
said lower holding layer having an upper side,
a thin upper holding layer located in said cavity and having an opening formed therethrough,
said upper holding layer having an upper side and a lower side,
a thin transparent layer of material in sheet form having a bottom side securely coupled to the upper side of said upper holding layer and having dimensions such that said transparent layer of material covers the opening of said upper holding layer,
said transparent layer of material having an upper side,
said transparent layer of material and said upper holding layer being located in said cavity with the lower side of said upper holding layer facing the upper side of said lower holding layer and the upper side of said transparent layer of material facing upward and being about flush with the level of the floor when located in said cavity,
an advertising layer located in said cavity below said transparent layer of material,
said transparent layer of material and said upper holding layer being movable relative to said lower holding layer for receiving said advertising layer below said transparent layer of material,
said opening formed through said upper holding layer being sufficient to allow the desired advertisement of said advertising layer to be seen through said opening and through said transparent layer of material when viewed from above,
said upper and lower holding layers each comprising magnetic material forming magnetic lines of force for removably holding said upper and lower holding layers together when said upper and lower holding layers are located next to each other.

2. The advertising apparatus of claim 1 wherein:
said cavity and said layers are rectangular in shape,
said transparent layer of material and said upper holding layer each having first and second opposite edges with said first edges of said transparent layer of material and of said upper holding layer being adjacent to each other and said second edges of said transparent layer of material and of said upper holding layer being adjacent to each other, said transparent layer of material and said upper holding layer being flexible, said first edge and adjacent lower side of said upper holding layer being securely coupled to said lower holding layer with the remaining lower side portion of said upper holding layer removably coupled to said lower holding layer whereby said second edges of said transparent layer of material and of said upper holding layer may be lifted from said lower holding layer and folded toward said first edges of said transparent layer of material and of said upper holding layer to allow insertion and removal of said advertising layer.

3. The advertising apparatus of claim 1, wherein:

said lower holding layer has a rectangular shaped opening formed therethrough, a rectangular support layer having an upper side, said rectangular support layer being secured to said lower portion of said cavity within said opening of said lower holding layer for location partially within said opening of said upper holding layer when said transparent layer of material and said upper holding layer are located in said cavity for supporting said advertising layer.

4. The advertising apparatus of claim 1, wherein:

said cavity has a lower floor of concrete or the like and a depth from said lower floor of the order of one-eighth of an inch, said lower holding layer, said upper holding layer and said transparent layer of material each having a thickness such that when said lower holding layer, said upper holding layer and said transparent layer of material are located in said cavity, the upper side of said transparent layer of material is about flush with the level of the floor.

5. The advertising apparatus of claim 1, wherein:

said cavity has inner edges, said transparent layer of material and said upper holding layer having outer edges with dimensions respectively about equal to each other and sufficient to extend substantially to said inner edges of said cavity, said upper side of said transparent layer of material being substantially flat between its said outer edges when located in said cavity, said lower side of said upper holding layer removably engages said upper side of said lower holding layer and forms a seal when said upper holding layer is located in said cavity.

6. The advertising apparatus of claim 3, wherein:

said cavity and said layers are rectangular in shape, said transparent layer of material and said upper holding layer each having first and second opposite edges with said first edges of said transparent layer of material and of said upper holding layer being adjacent to each other and said second edges of said transparent layer of material and of said upper holding layer being adjacent to each other, said transparent layer of material and said upper holding layer being flexible, said first edge and adjacent lower side of said upper holding layer being securely coupled to said lower holding layer with the remaining lower side portion of said upper holding layer removably coupled to said lower holding layer whereby said second edges of said transparent layer of material and of said upper holding layer may be lifted from said lower holding layer and folded toward said first edges of said transparent layer of material and of said upper holding layer to allow insertion and removal of said advertising layer.

7. The advertising apparatus of claim 4, wherein:

said cavity and said layers are rectangular in shape, said transparent layers of material and said upper holding layer each having first and second opposite edges with said first edges of said transparent layer of material and of said upper holding layer being adjacent to each other and said second edges of said transparent layer of material and of said upper holding layer being adjacent to each other, said transparent layer of material and said upper holding layer being flexible, said first edge and adjacent lower side of said upper holding layer being securely coupled to said lower holding layer with the remaining lower side portion of said upper holding layer removably coupled to said lower holding layer whereby said second edges of said transparent layer of material and of said upper holding layer may be lifted from said lower holding layer and folded toward said first edges of said transparent layer of material and of said upper holding layer to allow insertion and removal of said advertising layer.

8. The advertising apparatus of claim 5, wherein:

said cavity and said layers are rectangular in shape, said transparent layer of material and said upper holding layer each having first and second opposite edges with said first edges of said transparent layer of material and of said upper holding layer being adjacent to each other and said second edges of said transparent layer of material and of said upper holding layer being adjacent to each other, said transparent layer of material and said upper holding layer being flexible, said first edge and adjacent lower side of said upper holding layer being securely coupled to said lower holding layer with the remaining lower side portion of said upper holding layer removably coupled to said lower holding layer whereby said second edges of said transparent layer of material and of said upper holding layer may be lifted from said lower holding layer and folded toward said first edges of said transparent layer of material and of said upper holding layer to allow insertion and removal of said advertising layer.

9. The advertising apparatus of claim 4, wherein:

said lower holding layer has a rectangular shaped opening formed therethrough, a rectangular support layer having an upper side, said rectangular support layer being secured to said lower portion of said cavity within said opening of said lower holding layer for location partially within said opening of said upper holding layer when said transparent layer of material and said upper holding layer are located in said cavity for supporting said advertising layer.

10. The advertising apparatus of claim 5, wherein:

said lower holding layer has a rectangular shaped opening formed therethrough, a rectangular support layer having an upper side, said rectangular support layer being secured to said lower portion of said cavity within said opening of said lower holding layer for location partially within said opening of said upper holding layer when said transparent layer of material and said upper holding layer are located in said cavity for supporting said advertising layer.

11. The advertising apparatus of claim 4, wherein:

said cavity has inner edges, said transparent layer of material and said upper holding layer having outer edges with dimensions respectively about equal to each other and sufficient to extend substantially to said inner edges of said cavity, said upper side of said transparent layer of material being substantially flat between its said outer edges when located in said cavity, said lower side of said upper holding layer removably engages said upper side of said lower holding layer and forms a seal when said upper holding layer is located in said cavity.

12. The advertising apparatus of claim 6, wherein:

said cavity has a lower floor of concrete or the like and a depth from said lower floor of the order of one-eighth of an inch, said lower holding layer, said upper holding layer and said transparent layer of material each having a thickness such that when said lower holding layer, said upper holding layer and said transparent layer of material are located in said cavity, the upper side of said transparent layer of material is about flush with the level of the floor.

13. The advertising apparatus of claim 6, wherein:

said cavity has inner edges, said transparent layer of material and said upper holding layer having outer edges with dimensions respectively about equal to each other and sufficient to extend substantially to said inner edges of said cavity, said upper side of said transparent layer of material being substantially flat between its said outer edges when located in said cavity, said lower side of said upper holding layer removably engages said upper side of said lower holding layer and forms a seal when said upper holding layer is located in said cavity.

14. The advertising apparatus of claim 12, wherein:

said cavity has inner edges, said transparent layer of material and said upper holding layer having outer edges with dimensions respectively about equal to each other and sufficient to extend substantially to said inner edges of said cavity, said upper side of said transparent layer of materials being substantially flat between its said outer edges when located in said cavity, said lower side of said upper holding layer removably engages said upper side of said lower holding layer and forms a seal when said upper holding layer is located in said cavity.

15. A floor type advertising apparatus for use in a cavity formed in a floor, with the cavity having a lower portion, comprising:

a thin lower holding layer adapted to be located in and secured in the lower portion of the cavity, said lower holding layer having an upper side, a thin upper holding layer having an opening formed therethrough, said upper holding layer having an upper side and a lower side, a thin transparent layer of material in sheet form having a bottom side secured to the upper side of said upper holding layer and having dimensions such that said transparent layer of material covers the opening of said upper holding layer, said transparent layer of material having an upper side, said transparent layer of material and said upper holding layer being adapted to be located in the cavity with the lower side of said upper holding layer facing the upper side of said lower holding layer and the upper side of said transparent layer of material facing upward, said transparent layer of material and said upper holding layer being movable relative to said lower holding layer for receiving an advertising layer therebetween, said opening formed through said upper holding layer being sufficient to allow the desired advertisement of the advertising layer to be seen through said opening and through said transparent layer of material, said upper and lower holding layers each comprising magnetic material forming magnetic lines of force for removably holding said upper and lower layers together when said upper and lower holding layers are located next to each other.

16. The advertising apparatus of claim 15, wherein:

said transparent layer of material and said upper holding layer each having first and second opposite edges with said first edges of said transparent layer of material and of said upper holding layer being adjacent to each other and said second edges of said transparent layer of material and of said upper holding layer being adjacent to each other, said transparent layer of material and said upper holding layer being flexible, said first edge and adjacent lower side of said upper holding layer being securely coupled to said lower holding layer with the remaining lower side portion of said upper holding layer being removably coupled to said lower holding layer whereby said second edges of said transparent layer of material and of said upper holding layer may be moved from said lower holding layer and folded toward said first edges of said transparent layer of material and of said upper holding layer to allow insertion and removal of the advertising layer.

17. The advertising apparatus of claim 15, wherein:

said lower holding layer has an opening formed therethrough, a support layer having an upper side, said support layer being adapted to be secured to the lower portion of the cavity for location partially within said opening of said upper holding layer when said transparent layer of material and said upper holding layer are located in said cavity for supporting the advertising layer.

18. The advertising apparatus of claim 15, wherein:

said lower holding layer, said upper holding layer and said transparent layer of material have a total thickness of the order of $\frac{1}{8}$ of an inch.

19. The advertising apparatus of claim 15, wherein:

said upper side of said transparent layer of material being substantially flat between its said outer edges when located in the cavity, said lower side of said upper holding layer removably engages said upper side of said lower holding layer and forms a seal.

20. The advertising apparatus of claim 17, wherein:

said transparent layer of material and said upper holding layer each having first and second opposite edges with said first edges of said transparent layer of material and of said upper holding layer being adjacent to each other and said second edges of said transparent layer of material and of said upper holding layer being adjacent to each other, said transparent layer of material and said upper holding layer being flexible, said first edge and adjacent lower side of said upper holding layer being securely coupled to said lower holding layer with the remaining lower side portion of said upper holding layer being removably coupled to said lower holding layer whereby said second edges of said transparent layer of material and of said upper holding layer may be moved from said lower holding layer and folded toward said first edges of said transparent layer of material and of said upper holding layer to allow insertion and removal of the advertising layer.

21. The advertising apparatus of claim 18, wherein:

said transparent layer of material and said upper holding layer each having first and second opposite edges with said first edges of said transparent layer of material and of said upper holding layer being adjacent to each other and said second edges of said transparent layer of material and of said upper holding layer being adjacent to each other, said transparent layer of material and said upper holding layer being flexible, said first edge and adjacent lower side of said upper holding layer being securely coupled to said lower holding layer with the remaining lower side portion of said upper holding layer being removably coupled to said lower holding layer whereby said second edges of said transparent layer of material and of said upper holding layer may be moved from said lower holding layer and folded toward said first edges of said transparent layer of material and of said upper holding layer to allow insertion and removal of the advertising layer.

22. The advertising apparatus of claim 19, wherein:

said transparent layer of material and said upper holding layer each having first and second opposite edges with said first edges of said transparent layer of material and of said upper holding layer being adjacent to each other and said second edges of said transparent layer of material and of said upper holding layer being adjacent to each other, said transparent layer of material and said upper holding layer being flexible, said first edge and adjacent lower side of said upper holding layer being securely coupled to said lower holding layer with the remaining lower side portion of said upper holding layer being removably coupled to said lower holding layer whereby said second edges of said transparent layer of material and of said upper holding layer may be moved from said lower holding layer and folded toward said first edges of said transparent layer of material and of said upper holding layer to allow insertion and removal of the advertising layer.

23. The advertising apparatus of claim 18, wherein:

said lower holding layer has an opening formed therethrough, a support layer having an upper side, said support layer being adapted to be secured to the lower portion of the cavity for location partially within said opening of said upper holding layer when said transparent layer of material and said upper holding layer are located in said cavity for supporting the advertising layer.

24. The advertising apparatus of claim 19, wherein:

said lower holding layer has an opening formed therethrough, a support layer having an upper side, said support layer being adapted to be secured to the lower portion of the cavity for location partially within said opening of said upper holding layer when said transparent layer of material and said upper holding layer are located in said cavity for supporting the advertising layer.

25. The advertising layer of claim 18, wherein:

said upper side of said transparent layer of material being substantially flat between its said outer edges when located in the cavity, said lower side of said upper holding layer removably engages said upper side of said lower holding layer and forms a seal.

26. The advertising apparatus of claim 20, wherein:

said lower holding layer, said upper holding layer and said transparent layer of material have a total thickness of the order of $\frac{1}{8}$ of an inch.

27. The advertising apparatus of claim 20, wherein:

said upper side of said transparent layer of material being substantially flat between its said outer edges when located in the cavity, said lower side of said upper holding layer removably engages said upper side of said lower holding layer and forms a seal.

28. The advertising apparatus of claim 26, wherein:

said upper side of said transparent layer of material being substantially flat between its said outer edges when located in the cavity, said lower side of said upper holding layer removably engages said upper side of said lower holding layer and forms a seal.

* * * * *